No. 681,367. Patented Aug. 27, 1901.
H. A. IRVINE.
REDUCTION OF ORES OR COMPOUNDS.
(Application filed Nov. 15, 1898.)

(No Model.)

WITNESSES

INVENTOR
Hugh Alexander Irvine
by Banwell & Banwell
his Attorneys.

THE NORRIS PETERS CO., PHOTO-LITHO., WASHINGTON, D. C.

UNITED STATES PATENT OFFICE.

HUGH ALEXANDER IRVINE, OF NIAGARA FALLS, NEW YORK.

REDUCTION OF ORES OR COMPOUNDS.

SPECIFICATION forming part of Letters Patent No. 681,367, dated August 27, 1901.

Application filed November 15, 1898. Serial No. 696,543. (No specimens.)

*To all whom it may concern:*

Be it known that I, HUGH ALEXANDER IRVINE, of Niagara Falls, in the county of Niagara and State of New York, have invented a new and useful Improvement in the Application of the Electric Current to the Reduction of Ores or Compounds, of which the following is a full, clear, and exact description, reference being had to the accompanying drawings, forming part of this specification, in which—

Figure 1:
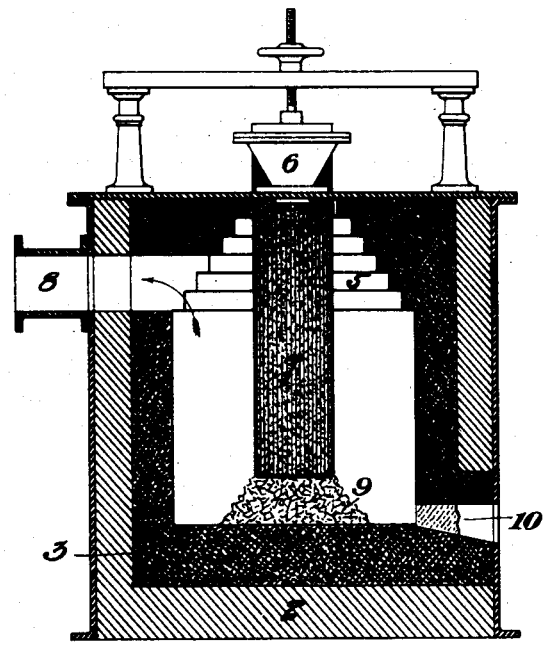
Figure 2:
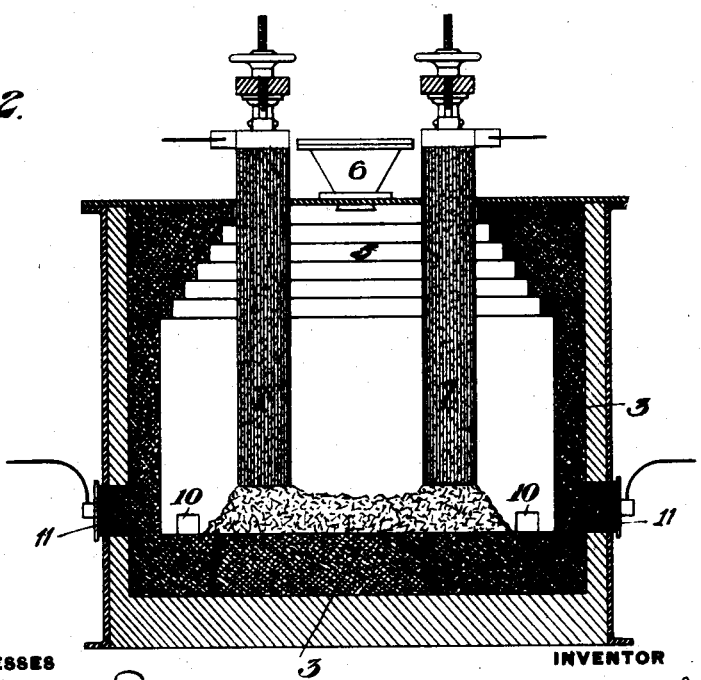

Figure 1 shows in vertical section an electric furnace in which my invention may be practiced. Fig. 2 is a vertical section taken at right angles to the section-plane of Fig. 1.

My invention has special reference to an improvement in the process of reducing ores or chemical compounds wherein a mixture of carbon and the ore or compounds is subjected to the heat generated by an electric current. The carbon combines with the oxygen of the ore or compounds, and the element, metal or metallic alloy, is liberated and either passes off in vapor to a suitable condensing apparatus or, if it is a non-volatile body, sinks and collects in the bed of the furnace.

My invention provides a novel mode for the generation of the electric heat and its more uniform diffusion and application to the ore or compound to be reduced, for I provide means whereby the electric current passes through the furnace, not through the body of the carbon and charge mixture, but by way of a body of liquid slag maintained for that purpose in the hearth of the furnace. The heat is generated by the passage of the current from one carbon rod through said slag to another carbon rod, both of which are connected with the electrical generator, and is communicated by radiation and heat conduction to the adjacent charge mixture.

In the common method of working an electric furnace the heat derived from the electric current is local and very intense. Such intense heat is liable to produce secondary products or by-products prejudicial to the main reactions of the furnace; but by my invention the heat is diffused, moderated, and rendered more uniform.

I will now proceed to describe my invention as applied to the reduction of phosphorus.

The furnace 2 shown in the drawings has a bed or basin 3, constituted, preferably, of packed carbon. The furnace is covered by an arch 5, through which extends one or more chutes or hoppers 6 for the introduction of the charge mixture. The two electrical conductors or carbon rods 7 extend through the top of the furnace, and a pipe 8 serves to convey the vapor of the reduced phosphorus to the condenser.

The charge of the furnace consists of a mixture of one or more phosphates, such as phosphates of lime and alumina, mixed with a sufficient quantity of coal, crushed coke, or anthracite coal for the complete reduction and liberation of the whole of the contained phosphorus. There is also added to the mixture, according to the chemical composition of the phosphate, sufficient silicious or basic material or a material containing both base and silica, such as a silicate, to act as a flux and to constitute the conducting-bath hereinafter described.

For the purpose of causing the current to pass through the furnace at the beginning before the conducting-bath of slag is melted I introduce between the end of the carbon rods 7 and the carbon basin of the furnace a conducting body or heap of coarsely-granulated coke 9, and I then fill the furnace-chamber with the charge material, which is fed into the hopper or hoppers 6 and preferably fills the hopper or hoppers themselves. The current is caused to pass through one carbon rod 7 and the carbon heap 9 into the second carbon rod. By its passage through the carbon heap the current will generate heat, which will act upon and fuse the adjacent portions of the surrounding charge mixture. The fusion or fluxing of the charge mixture takes place readily because of the presence of a suitable flux, as above described, and as the fusion proceeds there soon accumulates in the carbon basin 3 a body of liquid slag, which, rising to or nearly to the lower end of the carbon rods, constitutes an electrical conductor or current-path, electrically connecting the one carbon rod with the other carbon rod. Thereupon the coke heap, which was simply a preliminary or temporary conductor, ceases to exercise any further function, and the current passes from one carbon rod to the other carbon rod through the intermediate body of liquid slag. A steady and uniform heat is generated by the passage of the current through the mineral slag, keeping it in molten condition and causing the reduction of the charge mixture adjacent to the slag body, where it is subjected to the heat thereof. Such reduction takes place in a regular and continuous manner. As the phosphorus is driven off from the charge mixture the residue melts and forms part of the body of liquid slag, which as it accumulates can be tapped off from time to time through the tap-holes 10.

The process is a continuous one, as the charge mixture may be added from time to time to replace the portions reduced.

The current which I employ may be either an alternating or a continuous current. In the first instance no sensible electrolytic decomposition occurs, and in the latter case the heat of recomposition of the ions will compensate for the loss of electrical energy by electrolysis.

It is important that the level of the slag should not at any time be allowed to fall sufficiently far to interrupt the flow of the current and to prevent it from passing from one carbon rod to the other. If the slag-level be allowed to fall too far, it will be found very difficult to start the furnace again, for the unfused charge mixture itself is not sufficiently conducting to carry the current.

In some cases it may be desirable instead of passing the current from one carbon rod to the other to use the carbon lining of the furnace as one of the terminals. For this purpose I provide electrical connections 11 11, which may be connected with one of the poles of the electric generator.

By proper changes in ingredients, such as will be understood by those skilled in the art, I may apply my invention to the reduction of sodium, zinc, and other elements.

Within the scope of my invention as defined in the following claims many changes in the form and construction of the apparatus as well as in the proportion of the ingredients of the charge mixture can be made by those skilled in the art, since

I claim—

1. The method hereinbefore described, which consists in interposing between electric conductors a temporary conducting heap or mass, placing next to the same charge material having fusible mineral constituents and containing a reducing agent, passing a current through the intermediate mass, producing a fused body of mineral slag, and then continuing the passage of the current through such slag, and maintaining next to the slag a body of the charge material to be reduced by the heat generated by the passage of the current.

2. The method hereinbefore described, which consists in interposing between electric conductors a temporary conducting heap or mass of granular carbon, surrounding the same with charge material having fusible mineral constituents and containing a reducing agent, passing a current through the intermediate mass, producing a fused body of mineral slag, and then continuing the passage of the current through such slag and maintaining next to the slag a body of the charge material to be reduced by the heat generated by the passage of the current.

In testimony whereof I have hereunto set my hand.

HUGH ALEXANDER IRVINE.

Witnesses:
F. J. COE,
J. F. SLOCUM.